US012771452B2

(12) United States Patent
Igarashi et al.

(10) Patent No.: US 12,771,452 B2
(45) Date of Patent: Oct. 20, 2026

(54) SIGNAL STRENGTH FLATTENING METHOD AND RELAY NODE

(71) Applicant: NTT, Inc., Tokyo (JP)

(72) Inventors: Ryo Igarashi, Musashino (JP); Kazutaka Hara, Musashino (JP); Ryo Koma, Musashino (JP); Takahiro Suzuki, Musashino (JP)

(73) Assignee: NTT, Inc., Tokyo (JP)

( * ) Notice: Subject to any disclaimer, the term of this patent is extended or adjusted under 35 U.S.C. 154(b) by 307 days.

(21) Appl. No.: 18/719,033

(22) PCT Filed: Dec. 17, 2021

(86) PCT No.: PCT/JP2021/046817

§ 371 (c)(1),
(2) Date: Jun. 12, 2024

(87) PCT Pub. No.: WO2023/112326

PCT Pub. Date: Jun. 22, 2023

(65) Prior Publication Data

US 2025/0055568 A1 Feb. 13, 2025

(51) Int. Cl.

*H04J 14/02* (2006.01)
*H04B 10/293* (2013.01)
*H04Q 11/00* (2006.01)

(52) U.S. Cl.

CPC ....... *H04B 10/293* (2013.01); *H04Q 11/0062* (2013.01); *H04Q 2011/0086* (2013.01)

(58) Field of Classification Search

CPC .. H04J 14/02; H04J 14/0221; H04Q 11/0062; H04Q 11/0067; H04Q 11/0066; H04Q 11/0005; H04B 10/27; H04B 10/40; H04B 10/2507; H04B 10/0795; H04B 10/293; H04B 10/294; H04B 10/07955

USPC ........ 398/79, 45, 48, 49, 56, 57, 33, 38, 34, 398/37, 25, 173, 177, 94, 68, 72, 158, 398/159

See application file for complete search history.

(56) References Cited

U.S. PATENT DOCUMENTS 8,588,609 B2 * 11/2013 Hiraizumi ........ H04B 10/07953 398/30
8,620,160 B2 * 12/2013 Onaka .............. H04B 10/07955 398/94
2009/0016727 A1 * 1/2009 Ueki ................ H04B 10/07955 398/79

OTHER PUBLICATIONS

Hiroki Kawahara et al., "Optical Full-mesh Network Technologies Supporting the All-Photonics Network", Feature Articles: All-Photonics Network for Enabling Innovative Optical and Wireless Network (IOWN), NTT Technical Review vol. 18, No. 5, May 2020, pp. 24-29.

(Continued)

*Primary Examiner* — Hanh Phan
(74) *Attorney, Agent, or Firm* — Harness, Dickey & Pierce, P.L.C.

(57) ABSTRACT

A signal intensity flattening method includes: classifying a plurality of user devices accommodated in the same relay node so that user devices with similar optical signal intensities are in the same class; and setting a signal transmission path for converging optical signals transmitted from user devices of the same class in the same optical transmission line, and adjusting the signal intensities of the optical signals converged in the same optical transmission line collectively without separating them for each wavelength.

8 Claims, 15 Drawing Sheets

(56) References Cited

OTHER PUBLICATIONS

Hisato Uetsuka, "AWG Technologies for Dense WDN Applications", IEEE Journal of Selected Topics in Quantum Electronics, vol. 10, No. 2, Mar./ Apr. 2004.
S. Koenig et al., "Rival Signals in SOA Reach-Extended WDM-TDM-GPON Converged with RoF", OSA/OFC/NFOEC 2011, OWT1.

* cited by examiner

SIGNAL STRENGTH FLATTENING METHOD AND RELAY NODE

CROSS-REFERENCE TO RELATED APPLICATIONS

This application is a 371 U.S. National Phase of International Application No. PCT/JP2021/046817 filed on Dec. 17, 2021. The entire disclosure of the above application is incorporated herein by reference.

TECHNICAL FIELD

The present invention relates to a signal intensity flattening method and a relay node.

BACKGROUND ART

In recent years, studies have been underway to transmit optical signals as they are over an entire network (for example, NPL 1). FIG. 10 shows the configuration of an optical communication system that constitutes an all-optical network utilizing a wavelength division multiplexing (WDM) system. In the optical communication system shown in FIG. 10, transmitting terminals 200-1 to 200-3 and receiving terminals 300-1 to 300-3 are connected end-to-end by light without photoelectric conversion. An optical signal transmitted from each transmitting terminal 200 is input to one of relay nodes 350 and transmitted to the receiving terminal 300 after path switching is performed for each wavelength.

FIG. 11 is a diagram showing a configuration example of a conventional relay node 350. The relay node 350 includes a wavelength multiplexer/demultiplexer 351, an optical SW 352, a wavelength multiplexer/demultiplexer 353, a wavelength multiplexer/demultiplexer 354, an optical amplifier 355 and an optical amplifier 356. The wavelength multiplexers/demultiplexers 351, 353, and 354 are composed of, for example, arrayed waveguide gratings (AWGs). An optical signal input to the relay node 350 is separated for each wavelength by the wavelength multiplexer/demultiplexer 351, and a path of a desired output destination is switched by the optical SW 352. Thereafter, the optical signal is again wavelength-multiplexed by the wavelength multiplexer/demultiplexer 353 or 354, transmitted to the next relay destination, and finally transmitted to the opposite device (for example, the receiving terminals 300-1 to 300-3). If the node or transmission line loss is greater than a specified value, the optical amplifiers 355 and 356 are provided at the post-stage of the wavelength multiplexer/demultiplexer 353 or 354 as shown in FIG. 11 to amplify the optical signal.

Here, the problem of intensity variation in an optical communication system that constitutes an all-optical network will be described with reference to FIG. 12. A case will be considered in which transmitting terminals 200-1 and 200-2 (shown as Tx1 and Tx2 in FIG. 12) and receiving terminals 300-1 and 300-2 (shown as Rx1 and Rx2 in FIG. 12) communicate with each other. Here, it is assumed that the transmitting terminal 200-1 is located farther from the relay node than the transmitting terminal 200-2, and the transmission loss is large. If the transmission powers of the transmitting terminals 200 are equal, when the optical signals transmitted from the transmitting terminal 200 reach the optical amplifier 355-1, an intensity difference $\Delta P_{in}$ occurs in the optical signal levels. Changes in signal intensity (level diagram) with respect to transmission distance are shown in the lower part of FIG. 12.

In an optical communication system, when the signal intensity entering a receiver is lower than the minimum reception sensitivity, the code error rate increases due to the influence of thermal noise generated within the receiver. Therefore, in order to realize long-distance transmission with a large loss, it is effective to use an optical amplifier to compensate for the decrease in signal intensity.

Amplified spontaneous emission (ASE) emitted from an optical amplifier is optical noise and may degrade signal reception characteristics. For example, even if the intensity of the optical signal entering the receiver is amplified to a high level by an optical amplifier, if the ASE intensity for the optical signal is high, that is, if the optical signal to noise ratio (OSNR) is low, the code error rate decreases.

In order to avoid this, in all the passing optical amplifiers (for example, the optical amplifiers 355-1 to 355-3 in FIG. 12), it is important to keep the input optical signal intensity sufficiently higher than the level of the ASE emitted by the optical amplifiers. Therefore, by arranging the optical amplifiers so that the optical signal intensity is higher than a threshold value $P_{min}$ in all sections, it is possible to avoid deterioration of reception characteristics due to ASE. As described above, in order to avoid the influence of ASE, it is important to keep the signal intensity high in the transmission line, whereas when the optical signal intensity is excessively high, waveform degradation due to a nonlinear optical effect occurs, and the code error rate increases. The signal intensity affected by the nonlinear optical effect is defined as $P_{max}$. In general, for error-free transmission in a relay optical amplification system, it is important to design the transmission line so that the optical intensity in the transmission section is always between the "upper limit due to nonlinear effects ($P_{max}$)" and the "lower limit due to OSNR ($P_{min}$)."

If the loss between optical amplifiers is ΔL, the range of possible signal levels of the transmitting terminal 200-1 and the transmitting terminal 200-2 is $\Delta P_{in}+\Delta L$. For error-free transmission of both of these signals, it is necessary to satisfy the following condition.

$$\text{(Condition)}: P_{max} - P_{min} > \Delta P_{in} + \Delta L$$

Therefore, in order to increase the allowable distance between nodes (ΔL>>), it is important to reduce the intensity difference $\Delta P_{in}$.

A configuration using a variable optical attenuator (VOA) is exemplified as a signal intensity flattening technique for reducing the intensity difference (see, for example, NPL 2). FIG. 13 is a diagram showing a configuration example of a relay node 350_a_ using a variable optical attenuator. In the relay node 350_a_ shown in FIG. 13, the VOAs are arranged in the front stage of the ports of each wavelength of the wavelength multiplexers/demultiplexers 353 and 354, and the attenuation amount is independently controlled and thus the signal level for each wavelength can be flattened.

In the optical communication system shown in FIG. 12, it is important to keep the OSNR high. For that purpose, it is effective to increase the signal intensity at the time of incidence on the optical amplifier. On the other hand, in the method shown in FIG. 13, because strong signals are aligned with the weak signals by the VOA, the OSNR of the strong signals is lowered. On the other hand, when the optical amplifier 360 is used before signal flattening, as in the relay node 350_b_ shown in FIG. 14, strong signals can be amplified without being attenuated, thus avoiding degradation of OSNR. However, when wavelength-multiplexed signals with different intensities are amplified by the same amplifier, the gain of weak signals may be reduced. The reason is shown below.

The fiber optical amplifier shown in FIG. 15 is considered as an example. In the fiber optical amplifier, the optical signal to be amplified and a pump light emitted from the pump light generating LD 380 are made incident on the optical fiber serving as an amplification medium 370, and the power of the pump light is converted into an optical signal in the amplification medium 370. An optical fiber used as the amplification medium 370 is appropriately selected according to the wavelength band to be amplified, and for example, in the C band around 1,550 nm, an optical fiber to which erbium is added is often used. The gain of an optical amplifier depends on the intensity of the input optical signal. For example, when an optical signal relatively stronger than the pump light intensity is input, the power of the pump light propagating through the amplification medium 370 is reduced due to energy conversion from the pump light to the optical signal, and as a result, the gain is reduced. This is called gain saturation. On the other hand, when a signal weaker than the intensity of the pump light is input, the attenuation of the pump light due to energy conversion is small and thus a high gain can be obtained.

CITATION LIST

Non Patent Literature

[NPL 1]H. Kawahara et al., "Optical Full-mesh Network Technologies Supporting the All-Photonics Network," NTT Technical Review, Vol. 18 No. 5, May 2020, pp. 24-29.

[NPL 2] Hisato Uetsuka, Hiso AWG Technologies for dense WDM applications, IEEE J. Sel. Top. Quantum Electron., Vol. 10, No. 2, March/April 2004.

[NPL 3]S. Koenig et al., "Rival Signals in SOA Reach-Extended WDM-TDM-GPON Converged with RoF," OFC2011, OWT1, 2011.

SUMMARY OF INVENTION

Technical Problem

When signals with intensity variations are flattened and transmitted to a relay fiber, weaker signals require higher gains and stronger signals require lower gains. Thus, at first glance, gain saturation does not appear to be a problem. However, when wavelength-multiplexed signals with different intensities are amplified by the same amplifier as shown in FIG. 14, strong signals cause attenuation of pump light, and the gain of weak signals decreases. As described above, conventionally, there is a problem that the difference in intensity of optical signals transmitted from user devices accommodated in the same relay node cannot be flattened without reducing the OSNR.

In view of the above-mentioned circumstances, an object of the present invention is to provide a technology with which the difference in intensity of optical signals transmitted from user devices accommodated in the same relay node can be flattened without reducing the OSNR.

Solution to Problem

An aspect of the present invention provides a signal intensity flattening method including: classifying a plurality of user devices accommodated in the same relay node so that user devices with similar optical signal intensities are in the same class; and setting a signal transmission path for converging optical signals transmitted from user devices of the same class in the same optical transmission line, and adjusting the signal intensities of the optical signals converged in the same optical transmission line collectively without separating them for each wavelength.

An aspect of the present invention provides a signal intensity flattening method including: classifying a plurality of user devices accommodated in the same relay node into a minimum number of classes so that user devices with similar optical signal intensities are in the same class and a gain of a weak signal does not decrease due to gain saturation; and setting a signal transmission path for converging optical signals transmitted from user devices of the same class in the same optical transmission line, and converging optical signals transmitted from user devices of the same class in the same optical transmission line.

An aspect of the present invention provides a relay node including: an allocation unit that classifies a plurality of user devices accommodated therein so that user devices with similar optical signal intensities are in the same class, and sets a signal transmission path for converging optical signals transmitted from user devices of the same class in the same optical transmission line; and an adjustment unit that adjusts the signal intensities of the optical signals converged in the same optical transmission line by the allocation unit collectively without separating them for each wavelength.

An aspect of the present invention provides a relay node including: an allocation unit that classifies a plurality of user devices accommodated in the same relay node into a minimum number of classes so that user devices with similar optical signal intensities are in the same class and a gain of a weak signal does not decrease due to gain saturation, sets a signal transmission path for converging optical signals transmitted from user devices of the same class in the same optical transmission line, and converges optical signals transmitted from user devices of the same class in the same optical transmission line.

Advantageous Effects of Invention

According to the present invention, it is possible to flatten the difference in intensity of optical signals transmitted from user devices accommodated in the same relay node without reducing the OSNR.

DESCRIPTION OF EMBODIMENTS

An embodiment of the present invention will be described below with reference to the drawings.

First Embodiment

Figure 1:
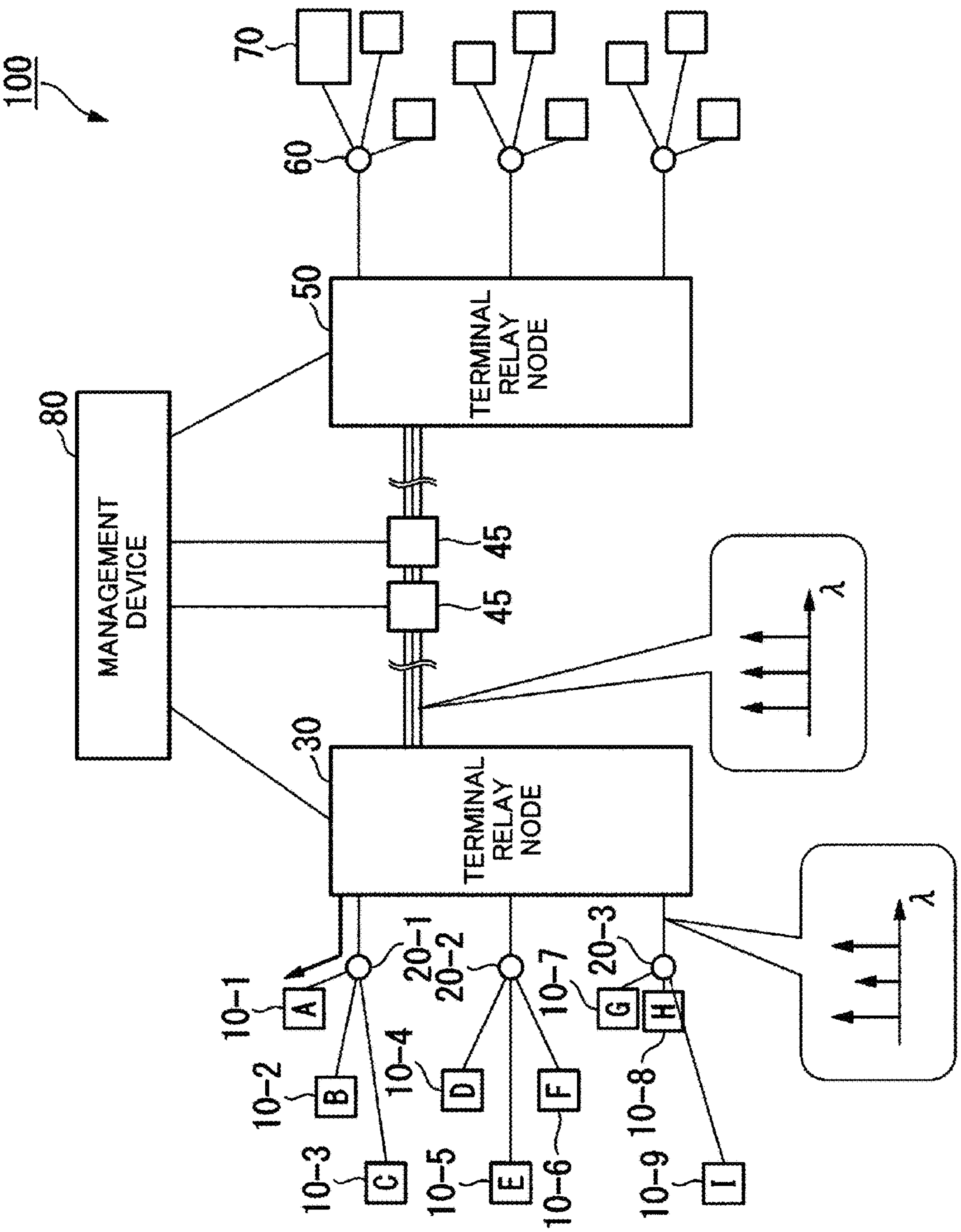
FIG. 1 is a diagram showing a configuration example of an optical communication system according to a first embodiment.

FIG. 1 is a diagram showing a configuration example of an optical communication system 100 according to the first embodiment. The optical communication system 100 includes a plurality of user devices 10-1 to 10-9, a plurality of optical splitters 20-1 to 20-3, a terminal relay node 30, one or more relay nodes 45, a terminal relay node 50, a plurality of optical splitters 60, a plurality of user devices 70, and a management device 80. In the following description, a case where the numbers of user devices 10 and user devices 70 are nine will be described as an example, but the numbers of user devices 10 and user devices 70 may be two or more.

In the following description, for convenience of description, user devices 10-1 to 10-9 may be denoted by symbols A to I in the drawings. Further, it is assumed that user devices 10-1, 10-2 and 10-3 are closer to the terminal relay node 30 in this order among user devices 10-1 to 10-3, user devices 10-4, 10-5 and 10-6 are closer to the terminal relay node 30 in this order among user devices 10-4 to 10-6, and user devices 10-7, 10-8 and 10-9 are closer to the terminal relay node 30 in this order among user devices 10-7 to 10-9.

The user devices 10-1 to 10-3 are connected to the optical splitter 20-1 via optical transmission lines, the user devices 10-4 to 10-6 are connected to the optical splitter 20-2 via optical transmission lines, the user devices 10-7 to 10-9 are connected to the optical splitter 20-3 via optical transmission lines. The optical transmission line is, for example, an optical fiber.

Furthermore, each optical splitter 20 is connected to the terminal relay node 30 via an optical transmission line, and the terminal relay node 30 is connected to the terminal relay node 50 via one or more relay nodes 45. In FIG. 1, for the sake of simplicity, it is assumed that the terminal relay node 30 and the terminal relay node 50 are connected by a one-to-one optical transmission line, and only optical amplification is performed at the relay node 45 between the terminal relay node 30 and the terminal relay node 50.

An optical signal transmitted from the user device 10-1 is wavelength-multiplexed together with the optical signals transmitted from the user devices 10-2 and 10-3 connected to the optical splitter 20-1, and input to the terminal relay node 30. However, there are variations in signal intensity for each distance from the terminal relay node 30.

The user devices 10 and 70 have wavelength-variable optical transceivers as optical transceivers. Therefore, the user devices 10 and 70 can communicate using any wavelength. The wavelengths used by the user devices 10 and 70 for communication are allocated by the management device 80. The optical transceiver may be an optical transceiver with AMCC (Auxiliary Management and Control Channel) function. In this case, the wavelength used by the user devices 10 and 70 is controlled using control signals superimposed by AMCC. The user devices 10 and 70 are, for example, ONUs (Optical Network Units) installed in the subscriber's homes.

The optical splitter 20 multiplexes or splits the input optical signals. For example, a plurality of English Translation of user devices 10 are connected to the optical splitter 20, and the optical splitter 20 multiplexes optical signals transmitted from each user device 10. The terminal relay node 30 is connected to the optical splitter 20, and the optical splitter 20 splits the optical signal output from the terminal relay node 30 and outputs the split optical signal to each user device 10.

The terminal relay node 30 is a relay device that transmits optical signals between the user device 10 and the user device 70. The terminal relay node 30 is provided at a position closest to the user device 10 than the other relay nodes. The terminal relay node 30 adjusts the signal intensities of the optical signals transmitted from the user devices 10 belonging to the same class and outputs the optical signals to the relay node 45. Here, the user devices 10 belonging to the same class are a group of user devices having similar optical signal intensities.

Depending on the installation location of the user device 10, the intensity of the optical signal input to the terminal relay node 30 differs even if each user device 10 transmits optical signals with the same transmission power. For example, the user device 10-1 is closer to the terminal relay node 30 than the user device 10-2 and 10-3. Therefore, when the terminal relay node 30 receives the optical signals transmitted by the user devices 10-1 to 10-3, the signal intensity of the optical signal transmitted from the user device 10-1 is greater than the signal intensity of the optical signals transmitted from the user devices 10-2 and 10-3. Thus, the intensity of the optical signal is based on the distance between the user device 10 and the terminal relay node 30.

The relay node 45 amplifies the optical signal between the terminal relay node 30 and the terminal relay node 50.

The terminal relay node 50 is a relay device that transmits optical signals between the user device 10 and the user device 70. The terminal relay node 50 is provided at a position closest to the user device 70 than the other relay nodes. The terminal relay node 50 adjusts the signal intensities of the optical signals transmitted from the user devices 70 belonging to the same class and outputs the optical signals to the relay node 45.

The optical splitter 60 multiplexes or splits the input optical signals. For example, a plurality of user devices 70 are connected to the optical splitter 60, and the optical splitter 60 multiplexes the optical signals transmitted from each user device 70. The terminal relay node 50 is connected to the optical splitter 60, and the optical splitter 60 splits the optical signal output from the terminal relay node 50 and outputs the optical signal to each user device 70.

The management device 80 controls at least the user devices 10 and 70, controls the optical SWs provided in the terminal relay nodes 30 and 50, and groups the user devices 10 and 70. Here, the control of the user devices 10 and 70 includes, for example, allocation of emission wavelengths to the user devices 10 and 70, instructions to stop light, instructions to change wavelengths, and the like. The control of the optical SW includes, for example, connection setting between ports of the optical SW, setting of the optical path, and the like.

Figure 2:
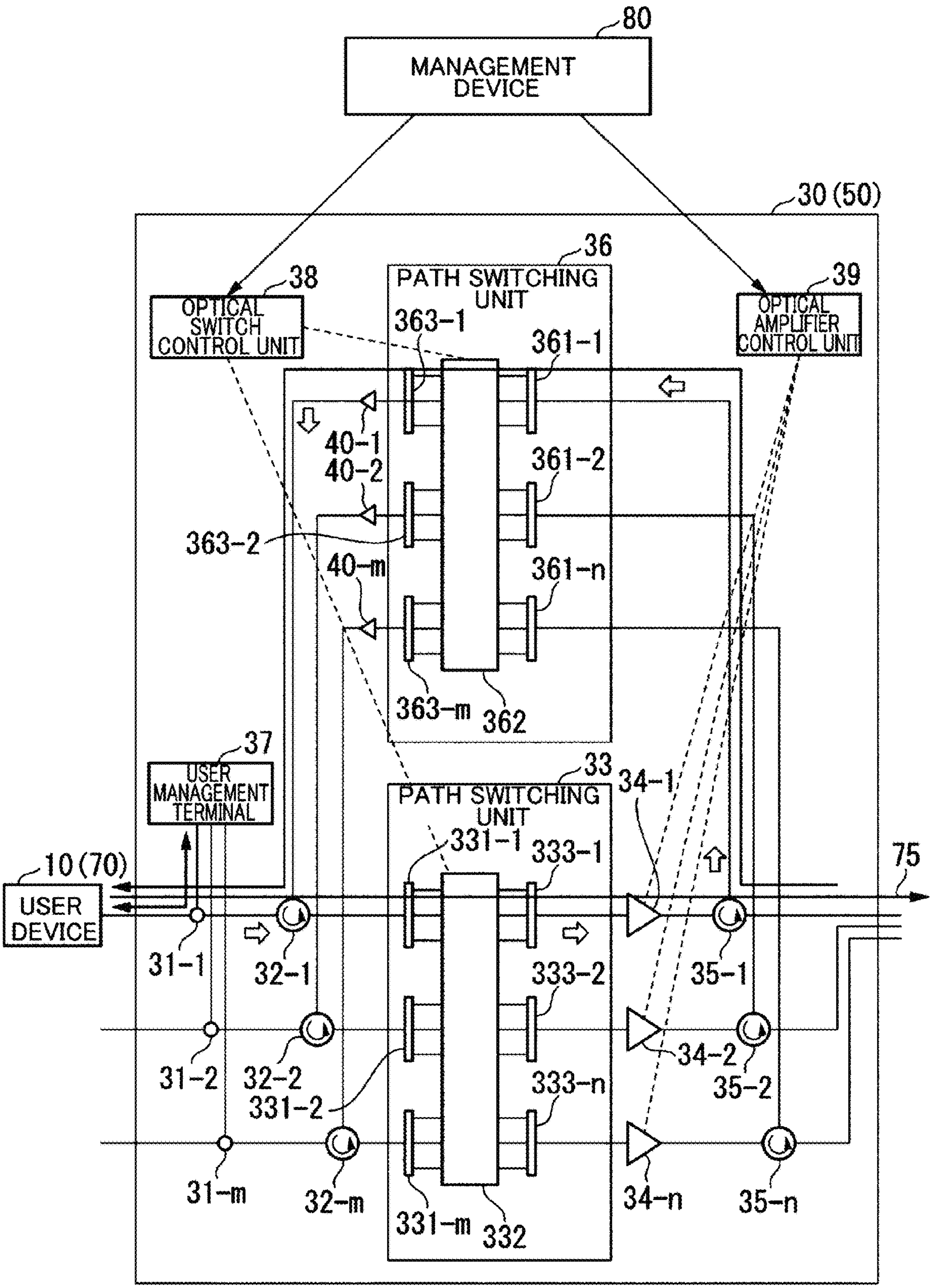
FIG. 2 is a diagram showing a configuration example of a terminal relay node in the first embodiment.

FIG. 2 is a diagram showing a configuration example of the terminal relay nodes 30 and 50 in the first embodiment. The terminal relay node 30 includes a plurality of splitters 31-1 to 31-*m* (m is an integer of 2 or more), a plurality of circulators 32-1 to 32-*m*, a path switching unit 33, a plurality of optical amplifiers 34-1 to 34-*n* (n is an integer of 2 or more), a plurality of circulators 35-1 to 35-*n*, a path switching unit 36, a user management terminal 37, an optical switch control unit 38, an optical amplifier control unit 39 and a plurality of optical amplifiers 40-1 to 40-*m*.

The splitters 31-1 to 31-*m* multiplex or split input optical signals. For example, the splitters 31-1 to 31-*m* split the optical signals transmitted from the user device 10 and output the optical signals to the user management terminal 37 and the circulators 32-1 to 32-*m*.

The circulators 32-1 to 32-*m* have at least three ports. In the following description, it is assumed that the circulators 32-1 to 32-*m* have three ports. First ports of the circulators 32-1 to 32-*m* are connected to the splitters 31-1 to 31-*m*. Second ports of the circulators 32-1 to 32-*m* are connected to the path switching unit 33. Third ports 53-3 of the circulators 32-1 to 32-*m* are connected to the optical amplifiers 40-1 to 40-*m*.

Optical signals input to the first ports of the circulators 32-1 to 32-*m* are output from the second ports. Optical signals input to the second ports of the circulators 32-1 to 32-*m* are output from the third ports. Optical signals input to the third ports of the circulators 32-1 to 32-*m* are output from the first ports.

The path switching unit 33 is composed of a plurality of wavelength multiplexers/demultiplexers 331-1 to 331-*m*, an optical SW 332, and a plurality of wavelength multiplexers/demultiplexers 333-1 to 333-*n*. The wavelength multiplexer/demultiplexer 331 is composed of an AWG or the like. The wavelength multiplexer/demultiplexer 331 multiplexes or demultiplexes the input optical signal for each wavelength.

The optical SW 332 is an optical switch having a plurality of first ports and a plurality of second ports. An optical signal input to a port of the optical SW 332 is output from another port. For example, an optical signal input to the first port of the optical SW 332 is output from the second port. The connection relationship between the first port and the second port of the optical SW 332 is set by the control of the optical switch control unit 38.

The wavelength multiplexer/demultiplexer 333 is composed of an AWG or the like. The wavelength multiplexer/demultiplexer 333 multiplexes or demultiplexes the input optical signal for each wavelength.

The optical amplifiers 34-1 to 34-*n* amplify optical signals with an amplification factor controlled by the optical amplifier control unit 39.

The circulators 35-1 to 35-*n* have at least three ports. In the following description, it is assumed that the circulators 35-1 to 35-*n* have three ports. First ports of the circulators 35-1 to 35-*n* are connected to the optical amplifiers 34-1 to 34-*m*. Second ports of the circulators 35-1 to 35-*n* are connected to optical transmission lines. Third ports of the circulators 35-1 to 35-*n* are connected to the path switching unit 36.

The optical signals input to the first ports of the circulators 35-1 to 35-*n* are output from the second ports. The optical signals input to the second ports of the circulators 35-1 to 35-*n* are output from the third ports. The optical signals input to the third ports of the circulators 35-1 to 35-*n* are output from the first ports.

The path switching unit 36 is composed of a plurality of wavelength multiplexers/demultiplexers 361-1 to 361-*n*, an optical SW 362, and a plurality of wavelength multiplexers/demultiplexers 363-1 to 363-*n*. The wavelength multiplexer/demultiplexer 361 is composed of an AWG or the like. The wavelength multiplexer/demultiplexer 361 multiplexes or demultiplexes the input optical signal for each wavelength.

The optical SW 362 is an optical switch having a plurality of first ports and a plurality of second ports. An optical signal input to a port of the optical SW 362 is output from another port. For example, an optical signal input to the first port of the optical SW 362 is output from the second port. The connection relationship between the first port and the second port of the optical SW 362 is set by the control of the optical switch control unit 38.

The wavelength multiplexer/demultiplexer 363 is composed of an AWG or the like. The wavelength multiplexer/demultiplexer 363 multiplexes or demultiplexes the input optical signal for each wavelength.

The user management terminal 37 is a terminal for managing the states of the user devices 10 and 70 connected to the terminal relay nodes 30 and 50. When the user devices 10 and 70 are newly connected to the terminal relay nodes 30 and 50, the user management terminal 37 first communicates with the user devices 10 and 70 to authenticate the user and confirm the destination terminal. The user management terminal 37 notifies the user devices 10 and 70 of the information on the allocated wavelengths notified by the management device 80.

The optical switch control unit 38 controls connection between the ports of the optical SWs 332 and 362. For example, the optical switch control unit 38 controls connection between the ports of the optical SW 332 so that the optical signals transmitted from the user devices 10 of the same class are input to the same wavelength multiplexer/demultiplexer 333. Controlling connection between ports means setting a path so that a port is connected to another port.

The optical amplifier control unit 39 controls the amplification factors of each optical amplifier 34 and each optical amplifier 40 based on the gain notified from the management device 80.

The optical amplifiers 40-1 to 40-*m* amplify optical signals with the amplification factor controlled by the optical amplifier control unit 39.

For example, it is assumed that the user device 10 is newly connected to the terminal relay node 30. In this case, after authentication of the user device 10 and wavelength allocation to the user device 10 are completed, the user device 10 transmits an optical signal to the opposite device via a path 75. The optical signal input to the terminal relay node 30 is divided by the circulator 32 according to the traveling direction of the signal. An optical signal transmitted from the user device 10 to the user device 70 is transmitted through an arbitrary optical transmission line by the path switching unit 33.

Figure 3:
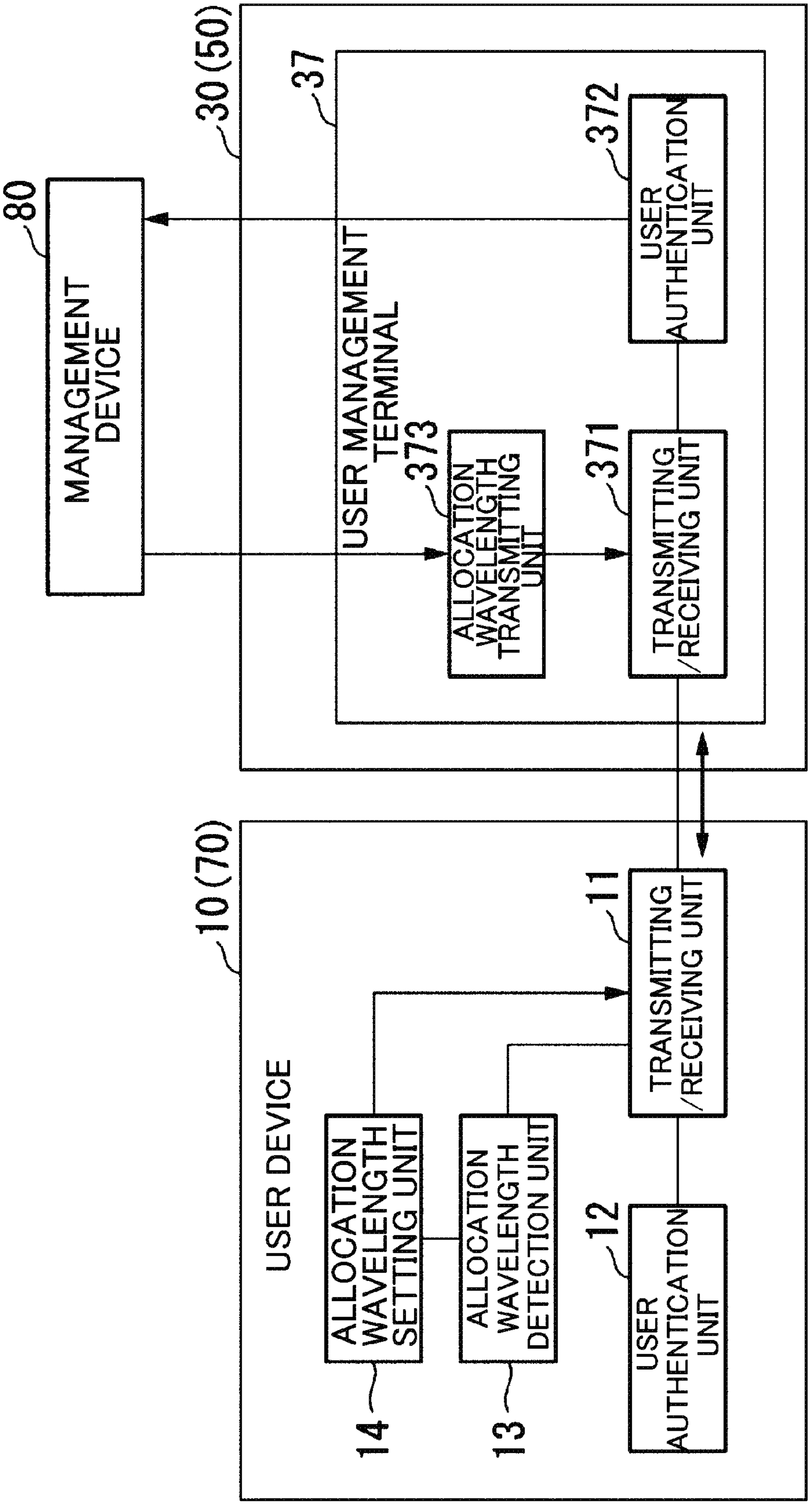
FIG. 3 is a diagram for explaining a configuration example of a user device and a user management terminal in the first embodiment.

FIG. 3 is a diagram for explaining a configuration example of the user devices 10 and 70 and the user management terminal 37 in the first embodiment. Note that FIG. 3 shows only the configuration necessary for explanation. First, the configuration of the user devices 10 and 70 will be described. Since the user devices 10 and 70 have the same configuration, the user device 10 will be described as an example here. The user device 10 includes a transmitting/receiving unit 11, a user authentication unit 12, an allocation wavelength detection unit 13, and an allocation wavelength setting unit 14.

The transmitting/receiving unit 11 is a wavelength-variable optical transceiver as an optical transceiver. The transmitting/receiving unit 11 communicates with the terminal relay node 30. For example, when the user device 10 newly connects to the terminal relay node 30, the transmitting/receiving unit 11 transmits an optical signal having a wavelength for initial connection to the terminal relay node 30. The transmitting/receiving unit 11 receives wavelength information notified from the user management terminal 37 of the terminal relay node 30.

The user authentication unit 12 performs authentication for connecting to the terminal relay node 30. For example, the user authentication unit 12 transmits preset authentication information to the terminal relay node 30 via the transmitting/receiving unit 11.

The allocation wavelength detection unit 13 detects wavelength information from the optical signal transmitted from the terminal relay node 30.

The allocation wavelength setting unit 14 sets the wavelength indicated by the detected wavelength information as the wavelength to be used for transmission/reception by the transmitting/receiving unit 11.

Next, a configuration example of the user management terminal 37 will be described. The user management terminal 37 includes a transmitting/receiving unit 371, a user authentication unit 372 and an allocation wavelength transmitting unit 373.

The transmitting/receiving unit 371 is a wavelength-variable optical transceiver as an optical transceiver. The transmitting/receiving unit 371 communicates with the user device 10. For example, the transmitting/receiving unit receives the authentication information transmitted from the user device 10. For example, the transmitting/receiving unit 371 transmits the wavelength information notified from the management device 80.

The user authentication unit 372 authenticates the newly connected user device 10 based on the authentication information received by the transmitting/receiving unit 371. When the newly connected user device 10 is authenticated (authentication OK), the user authentication unit 372 transmits information on the newly connected user device 10 to the management device 80. For example, the user authentication unit 372 transmits information indicating to which port of the optical SW the newly connected user device 10 is connected, information about the signal intensity of the optical signal transmitted from the user device 10, and the like to the management device 80. Note that the user authentication unit 372 notifies the user device 10 of an error when the newly connected user device 10 is not authenticated (authentication NG).

The allocation wavelength transmitting unit 373 transmits the wavelength information notified from the management device 80 to the user device 10 via the transmitting/receiving unit 371.

Figure 4:
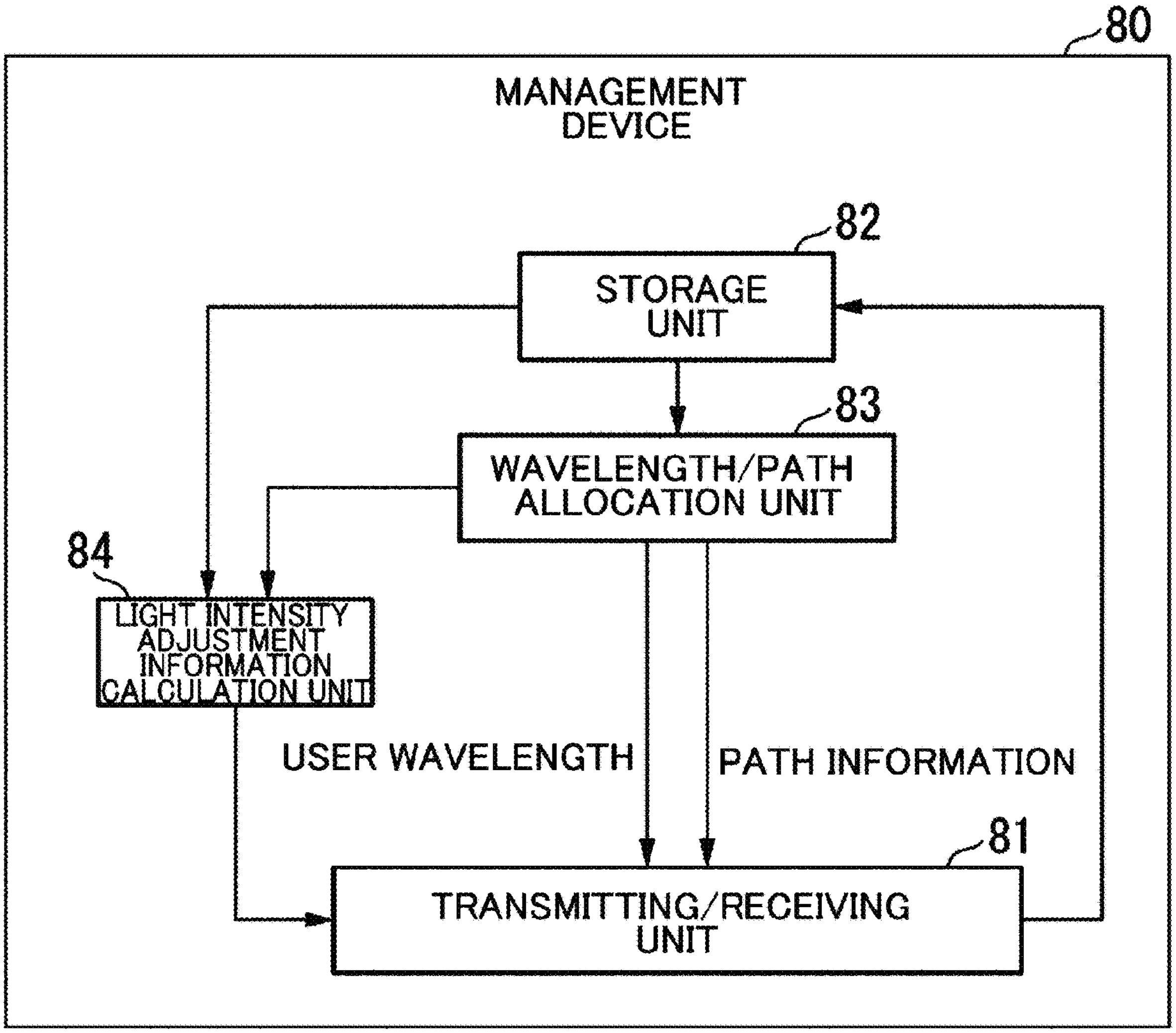
FIG. 4 is a diagram for explaining a configuration example of a management device in the first embodiment.

FIG. 4 is a diagram for explaining a configuration example of the management device 80 in the first embodiment. The management device 80 includes a transmitting/receiving unit 81, a storage unit 82, a wavelength/path allocation unit (allocator) 83, and a light intensity adjustment information calculation unit 84.

The transmitting/receiving unit 81 communicates with the terminal relay node 30, the relay node 45, and the terminal relay node 50. For example, the transmitting/receiving unit 81 receives the information of the user device newly connected to the terminal relay node 30 or 50 from the terminal relay node 30 or 50. The information on the newly connected user device includes, for example, transmission distance, arrival light intensity, and authentication information.

The storage unit 82 stores the information of the user device received by the transmitting/receiving unit 81 and the like. The storage unit 82 stores, for example, the transmission distance, arrival light intensity, and authentication information of the user device newly connected to the terminal relay node 30 or 50, and which port of the optical SW the user devices 10 and 70 are connected to, and information on the wavelengths allocated to the user devices 10 and 70.

The wavelength/path allocation unit 83 performs classification based on the information stored in the storage unit 82 and determines the user wavelength and path allocation (which wavelength is to be output to which optical transmission line) using a predetermined algorithm. The wavelength/path allocation unit 83 transmits the determined user wavelength and path information to be set to the optical SW to the transmitting/receiving unit 81. Note that the wavelength/path allocation unit 83 classifies the plurality of user devices 10 or 70 accommodated in the same terminal relay node 30 or 50 so that the user devices with similar optical signal intensities belong to the same class.

The light intensity adjustment information calculation unit 84 calculates the gain required for the optical amplifiers 34 and 40 included in the terminal relay node 30 or 50 based on the user wavelength and path information determined by the wavelength/path allocation unit 83 and the information such as the signal intensity obtained from the storage unit 82. However, if the VOA is used instead of the optical amplifier to adjust the signal intensity, the amount of attenuation given to the VOA will be estimated.

Figure 5:
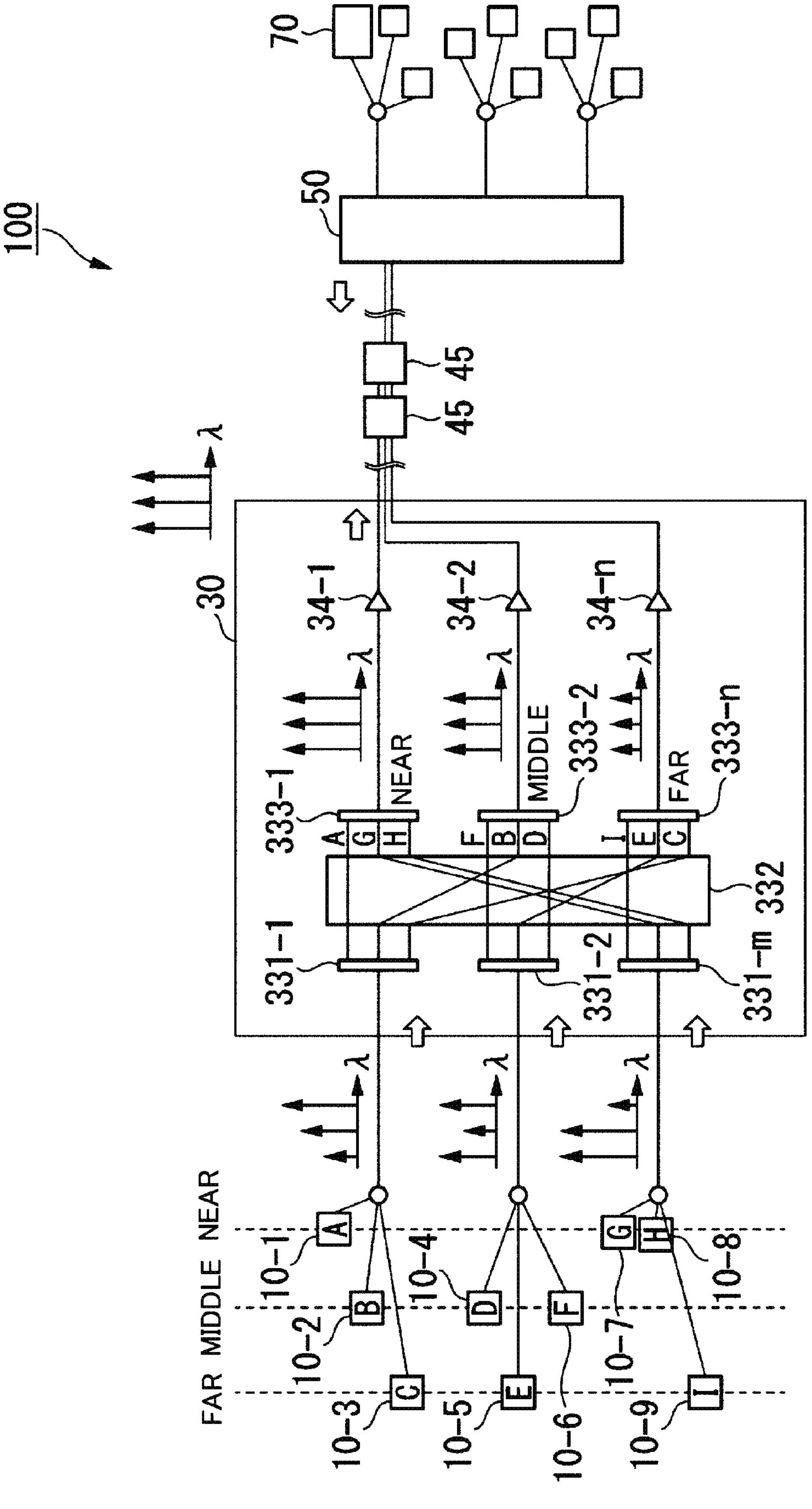
FIG. 5 is a diagram for explaining the outline of the operation of the optical communication system in the first embodiment.

Next, the allocation wavelength determined within the management device 80 and the algorithm for determining the path within the optical SW will be described. FIG. 5 is a diagram for explaining an outline of the operation of the optical communication system 100 according to the first embodiment. Here, for the sake of simplicity, it is assumed that optical signals transmitted from the user devices 10-1 to 10-9 are transmitted through the same terminal relay node 30 or 50 and relay node 45. That is, it is assumed that the optical signal transmitted from the user device 10-1 reaches the terminal relay node 50 closest to the user device 70 even if the optical signal is output from any optical transmission line connected to the terminal relay node 30.

Furthermore, for simplicity of explanation, only communication in the direction from the user device 10 to the user device 70 will be considered. Therefore, only functional units necessary for explanation are shown among the functional units provided in the terminal relay node 30.

Depending on the distance from the terminal relay node 30 to the user device 10, there is a difference in the signal intensity of the optical signal when it reaches the terminal relay node 30. In FIG. 5, the management device 80 classifies each user device 10 into one of "near," "middle," and "far" in descending order of the distance between the user device 10 and the terminal relay node 30. The closer the user device 10 to the terminal relay node 30, the smaller the transmission path loss, and the higher the signal intensity of the optical signal when it reaches the terminal relay node 30.

FIG. 5 shows an example in which, based on the distance between the user device 10 and the terminal relay node 30, the management device 80 classifies the user devices 10-1, 10-7 and 10-8 into the "near" class, the user device 10-2, 10-4 and 10-6 into the "middle" class, and the user devices 10-3, 10-5 and 10-9 into the "far" class.

By devising the wavelength allocation for each user device 10 and the connection between ports of the optical SW 332, it is possible to bundle optical signals from the user devices 10 of the classes having similar distances in the same optical transmission line. The example shown in FIG. 5 shows a case where the "near" class is allocated to the wavelength multiplexer/demultiplexer 331-1, the "middle" class is allocated to the wavelength multiplexer/demultiplexer 331-2, and the "far" class is allocated to the wavelength multiplexer/demultiplexer **331-*n***.

When the allocation as shown in FIG. 5 is performed, the optical switch control unit 38 controls the connection between the ports of the optical SW 332 so that the optical signals transmitted from the user devices 10-1, 10-7, and 10-8 belonging to the "near" class are input to the wavelength multiplexer/demultiplexer 333-1. Furthermore, the optical switch control unit 38 controls the connection between the ports of the optical SW 332 so that the optical signals transmitted from the user devices 10-2, 10-4, and 10-6 belonging to the "middle" class are input to the wavelength multiplexer/demultiplexer 333-2. Further, the optical switch control unit 38 controls the connection between the ports of the optical SW 332 so that the optical signals transmitted from the user devices 10-3, 10-5, and 10-9 belonging to the "far" class are input to the wavelength multiplexer/demultiplexer **333-*n*. Note that the wavelength/path allocation unit 83 of the management device 80 may perform wavelength switching based on the classification result so that the user devices 10** belonging to the same class do not use the same wavelength.

Since the optical switch control unit 38 performs connection control between the ports of the optical SW 332 as described above, optical signals having approximately the same signal intensity are input to each wavelength multiplexer/demultiplexer 333. In this case, the intensity of each wavelength bundled into respective paths is flattened. Furthermore, by appropriately setting the gain of the optical amplifier 34, all optical signal intensities can be aligned at the time of output to the relay node 45. Although the example shown in FIG. 5 shows the optical amplifier 34, a VOA may be used instead of the optical amplifier 34.

The example shown in FIG. 5 shows a case where there are three output ports, but when the number of user devices 10 accommodated in the terminal relay node 30 increases and the output ports become insufficient, an output port will be added. At this time, the gain of the optical amplifier 40 installed at the output port may be set according to the distribution of the user devices 10.

Figure 6:
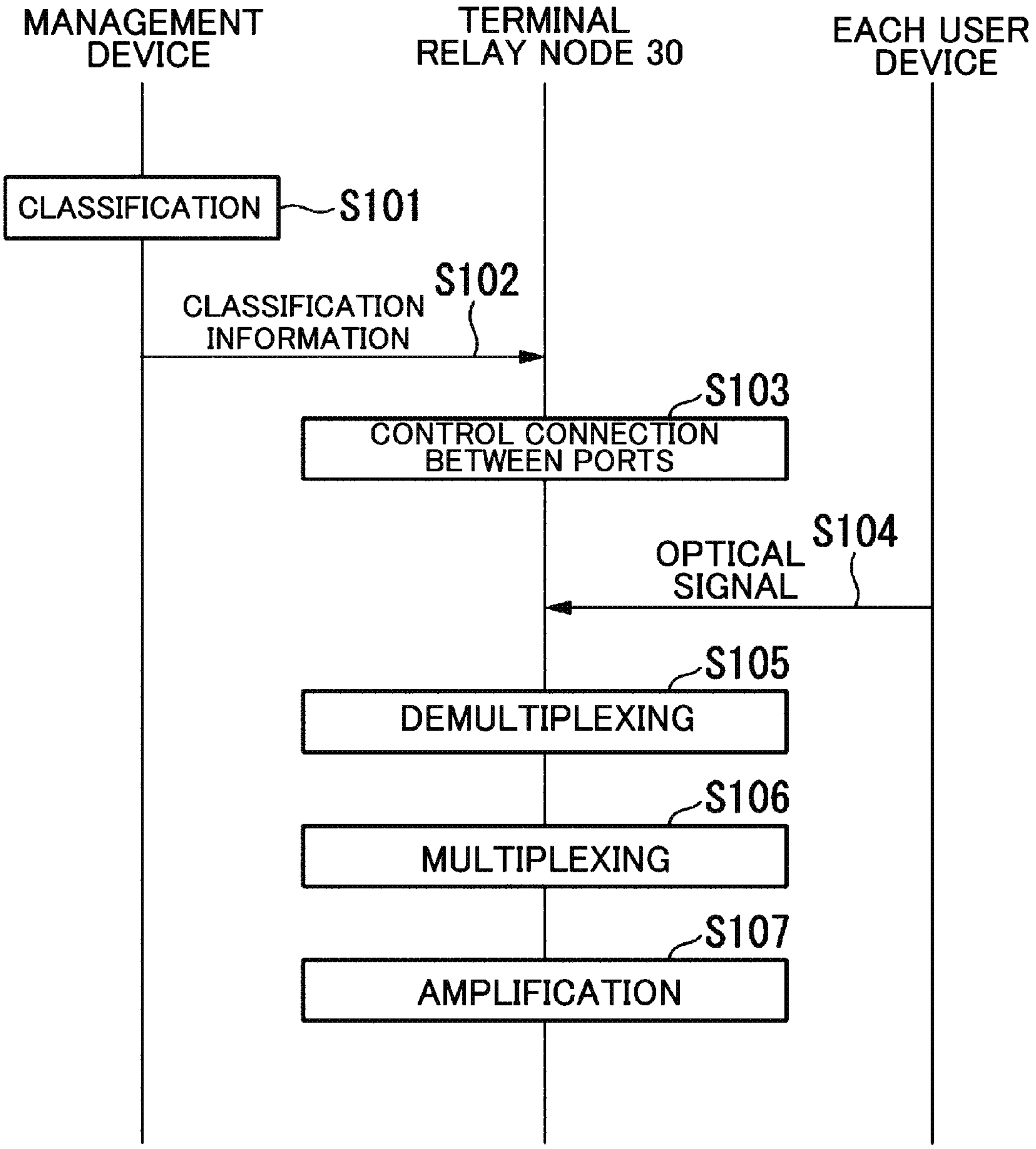
FIG. 6 is a sequence diagram for explaining the flow of processing in the optical communication system according to the first embodiment.

FIG. 6 is a sequence diagram for explaining the processing flow of the optical communication system 100 according to the first embodiment. In the description of FIG. 6, the case where the signal intensity is flattened at the terminal relay node 30 will be described. The wavelength/path allocation unit 83 of the management device 80 classifies each user device 10 accommodated in the terminal relay node 30 based on the information stored in the storage unit 82 (step S101). Here, the method of classification performed by the wavelength/path allocation unit 83 will be specifically described. For example, as a method of classification performed by the wavelength/path allocation unit 83, it is conceivable to classify the signals arriving from each user device 10 into classes on a grid with equal intervals for each intensity. For example, the wavelength/path allocation unit 83 classifies user devices 10 with reception light intensities of 0 to −10 dBm into the near class, user devices 10 with reception light intensities of −10 to −20 dBm into the middle class, and user devices 10 with reception light intensities of −20 to −30 dBm into the far class. It should be noted that the range of reception light intensity for classification is appropriately changed according to the operation. Furthermore, the wavelength/path allocation unit 83 allocates different wavelengths so that the wavelengths used do not overlap between user devices belonging to the same class.

It may be assumed that the intensity of the signal arriving from the user device 10 is equal to the signal intensity at the time of initial connection (before wavelength designation). Further, the distance may be estimated from the transmission delay time such as RTT (Round-Trip Time), and the reception light intensity may be estimated from the fiber loss per unit length, or the like, which is stored in advance. The above-mentioned classification method is an example, and other methods may be used as long as the classification can be performed based on the reception intensity of the optical signal.

The wavelength/path allocation unit 83 transmits the classification information indicating the result of classification and the path information to the terminal relay node 30 via the transmitting/receiving unit 81 (step S102). The path information transmitted here includes information for setting the path of the optical SW 332 so that the optical signals transmitted from the user devices 10 belonging to the same class are converged in the same optical transmission line. For example, in the case of the example shown in FIG. 5, the path information includes information for setting the paths in the optical SW 332 so that the optical signals transmitted from the user devices 10-1, 10-7, and 10-8 are output to the wavelength multiplexer/demultiplexer 333-1. As a result, the optical signals multiplexed by the wavelength multiplexer/demultiplexer 333-1 and converged in one optical transmission line are not separated for each wavelength, and the signal intensity can be collectively adjusted at the post-stage of the wavelength multiplexer/demultiplexer 333-1. The optical switch control unit 38 of the terminal relay node 30 controls connection between the ports of the optical SW (for example, the optical SW 332) based on the classification information and path information notified from the management device 80 (step S103).

Specifically, the optical switch control unit 38 controls connection between ports so that optical signals transmitted from user devices 10 of the same class are input to the same wavelength multiplexer/demultiplexer 333. Under the control of the optical switch control unit 38, connection between ports of the optical SW is switched. Each user device 10 transmits optical signals (step S104). The optical signals transmitted from each user device 10 are multiplexed by the optical splitter 20 and input to the terminal relay node 30 as a multiplexed signal. The multiplexed signal input to the terminal relay node 30 is input to the first port of the circulator 32.

For example, the multiplexed signals input to the first port of the circulator 32-1 of the terminal relay node 30 are output from the second port of the circulator 32-1. Since the wavelength multiplexer/demultiplexer 331-1 of the path switching unit 33 is connected to the second port of the circulator 32-1, the multiplexed signal output from the second port of the circulator 32-1 is input to the wavelength multiplexer/demultiplexer 331-1 of the path switching unit 33. The wavelength multiplexer/demultiplexer 331-1 of the path switching unit 33 demultiplexes the input multiplexed signal for each wavelength (step S105). The optical signal demultiplexed for each wavelength by the wavelength multiplexer/demultiplexer 331-1 is output to the wavelength multiplexer/demultiplexer 333 by the optical SW 332.

Similarly, the multiplexed signals input to the first ports of the circulators 32-2 to 32-*m* of the terminal relay node 30 are output from the second ports of the circulators 32-2 to 32-*m*. Since the wavelength multiplexers/demultiplexers 331-2 to 331-*m* of the path switching unit 33 are connected to the second ports of the circulators 32-2 to 32-*m*, the multiplexed signals output from the second ports of the circulators 32-2 to 32-*m* are input to the wavelength multiplexers/demultiplexers 331-2 to 331-*m* of the path switching unit 33. The wavelength multiplexers/demultiplexers 331-2 to 331-*m* of the path switching unit 33 demultiplex the input multiplexed signals for each wavelength. The optical signals demultiplexed for each wavelength by the wavelength multiplexers/demultiplexers 331-2 to 331-*m* are output to the wavelength multiplexers/demultiplexers 333-2 to 333-*n* by the optical SW 332.

Each wavelength multiplexer/demultiplexer 333 multiplexes the input optical signals (step S106). The multiplexed signal multiplexed by each wavelength multiplexer/demultiplexer 333 is amplified by the optical amplifier 40 (step S107).

According to the optical communication system 100 configured as described above, the management device 80 classifies a plurality of user devices 10 accommodated in the same terminal relay node 30 so that the user devices 10 with similar optical signal intensities are in the same class, sets a signal transmission path for converging optical signals transmitted from the user devices 10 of the same class in the terminal relay node 30 into the same optical transmission line, and adjusts the signal intensities of the optical signals converged into the same optical transmission line collectively without separating the signal intensities for each wavelength. For example, the terminal relay node 30 switches the connection between the ports of the optical SW 332 so that the optical signals transmitted from the user devices 10 of the same class are input to the same wavelength multiplexer/demultiplexer 333, and the wavelength multiplexer/demultiplexer 333 multiplexes the optical signals for each class and adjusts the signal intensity of the multiplexed optical signal. As a result, the signal intensities of the optical signals of each wavelength converged in the same optical transmission line are flattened. Therefore, it is possible to flatten the difference in intensity of optical signals transmitted from user devices accommodated in the same relay node without reducing the OSNR.

A modification of the first embodiment will be described.

In the configuration shown in FIG. 1, optical signals are wavelength-multiplexed using the optical splitters 20 and 60 in access sections between the user device 10 and the terminal relay node 30 and between the user device 70 and the terminal relay node 50. In the access section, wavelength multiplexing may be not performed. That is, each user device 10 may be directly connected to the terminal relay node 30 and each user device 70 may be directly connected to the terminal relay node 50.

Second Embodiment

In the first embodiment, a configuration in which the distance between the user device and the English Translation of terminal relay node is classified into three classes, "near," "middle," and "far," in descending order, and the signal intensity is flattened for each class has been described. Here, the larger the total number of classes, the smaller the wavelength variation after flattening can be made. However, if the total number of classes is large compared to the scale of the user devices accommodated by the terminal relay node, the number of user devices classified into one class may decrease, resulting in an increase in the number of devices such as optical amplifiers. In the second embodiment, in order to avoid such a problem, for example, the number of classes is set to the minimum number that does not cause the gain reduction of weak signals due to gain saturation, and rough flattening is performed. After that, fine flattening is performed using the wavelength multiplexer/demultiplexer and VOA arranged at the post-stage of the optical amplifier.

Figure 7:
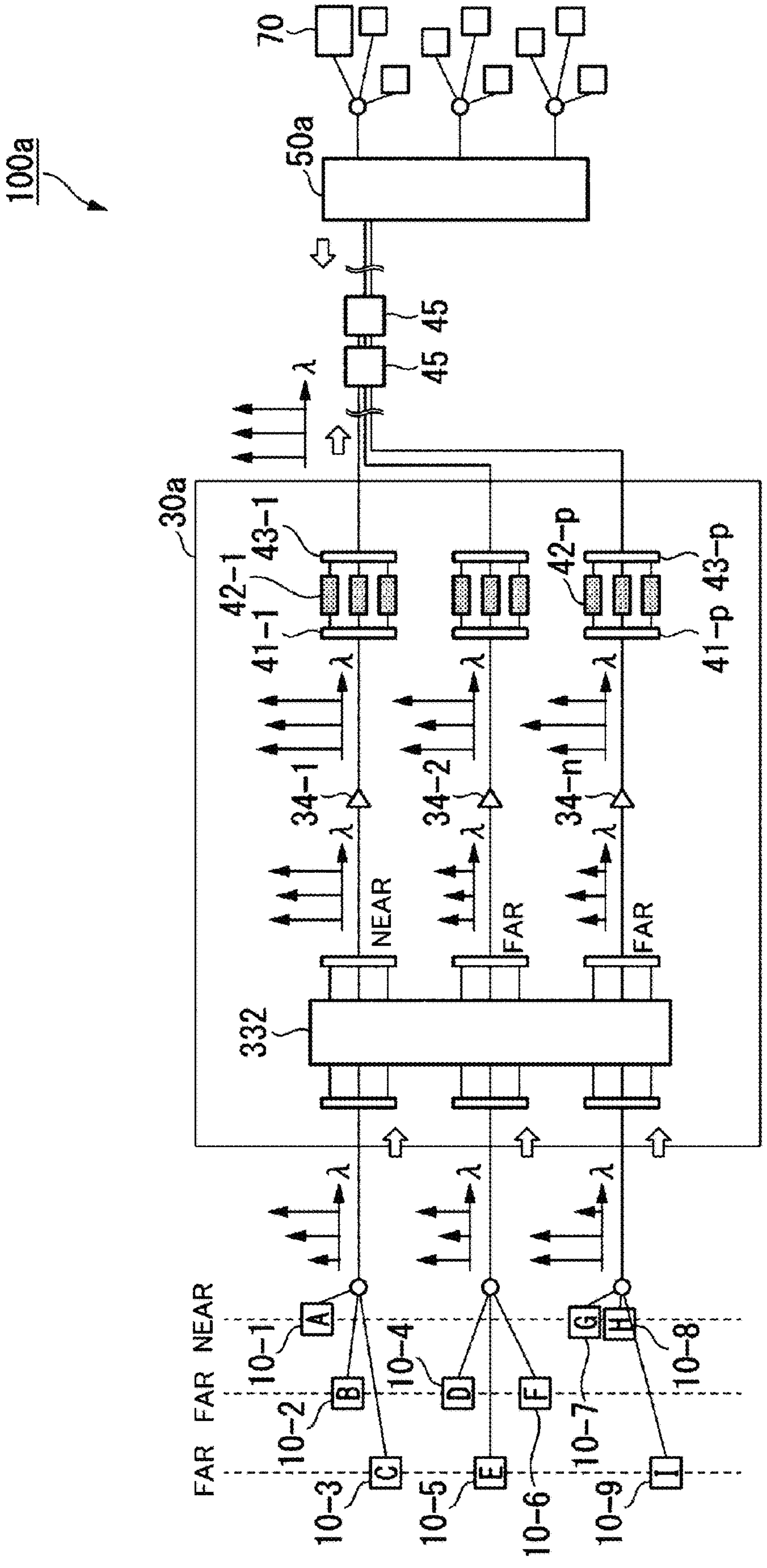
FIG. 7 is a diagram showing a configuration example of an optical communication system according to a second embodiment.

FIG. 7 is a diagram showing a configuration example of an optical communication system 100*a* according to the second embodiment. The basic system configuration of the second embodiment is the same as that of the first embodiment. The difference in the second embodiment lies in the number of classes classified by the management device 80 being the minimum number of classes (for example, two classes) that does not cause the gain reduction of weak signals due to gain saturation, and the configuration of the terminal relay nodes 30*a* and 50*a*. Since the terminal relay nodes 30*a* and 50*a* have the same configuration, the terminal relay node 30*a* will be described as an example. In the following description, as shown in FIG. 7, the configuration that differs from the first embodiment will be described.

The terminal relay node 30*a* in the second embodiment additionally includes, at the post-stage of each optical amplifier 34, a plurality of wavelength multiplexers/demultiplexers 41-1 to 41-*p* (p is an integer of 1 or more), a plurality of VOAs (adjuster) 42-1 to 42-*p* and a plurality of wavelength multiplexers/demultiplexers 43-1 to 43-*p*. The wavelength multiplexers/demultiplexers 41-1 to 41-*p* multiplex or demultiplex the input optical signals for each wavelength. The VOAs 42-1 to 42-*p* are provided by the number of wavelengths demultiplexed by the wavelength multiplexers/demultiplexers 41-1 to 41-*p*. The VOAs 42-1 to 42-*p* adjust signal intensity for each wavelength. The wavelength multiplexers/demultiplexers 43-1 to 43-*p* multiplex or demultiplex the input optical signals for each wavelength.

According to the optical communication system 100*a* configured as described above, when the classes are reduced to two, "near" and "far," compared to the first embodiment, the signal intensity of the optical signal after passing through the optical amplifier 40 varies greatly. Since the signal intensity is finely adjusted by the VOA at the post-stage, the signal can be flattened. In a conventional configuration in which optical amplification is performed after aligning the intensity with a VOA, the OSNR decreases because the optical intensity at the time of incidence on the optical amplifier decreases. On the other hand, when the intensity is aligned with a VOA after optical amplification, the decrease in OSNR can be prevented, but the gain of weak signals decreases. On the other hand, in the optical communication system 100*a*, in a configuration with a high OSNR in which a VOA is installed in the post-stage of optical amplification, the signal levels are aligned by classification so that the gain of weak signals does not decrease. Thus, the gain reduction of weak signals can be suppressed.

A modification of the second embodiment will be described.

In the above-described configuration, in the terminal relay node 30*a*, optical signals transmitted from the user devices 10 belonging to the same class are converged in the same optical transmission line, and then fine adjustment is performed for each wavelength using the VOA. On the other hand, if the signal variation after the minimum classification is within the permissible range of the system, the terminal relay node 30*a* may not perform fine adjustment for each wavelength using the VOA. In this configuration, for example, in the terminal relay node 30*a*, a path without the wavelength multiplexer/demultiplexer 41, the VOA 42, and the wavelength multiplexer/demultiplexer 43 may be provided at the post-stage of the optical SW 332, and the optical signals transmitted from the user devices 10 belonging to the class in which the signal variation is within the permissible range of the system may be converged in the same optical transmission line, and transmitted to the relay node 45 on a path that does not pass through the wavelength multiplexer/demultiplexer 41, the VOA 42, and the wavelength multiplexer/demultiplexer 43.

Third Embodiment

In the third embodiment, a configuration in which the function of the terminal relay node of the first embodiment is added to a ROADM (reconfigurable optical add/drop multiplexer) will be described.

Figure 8:
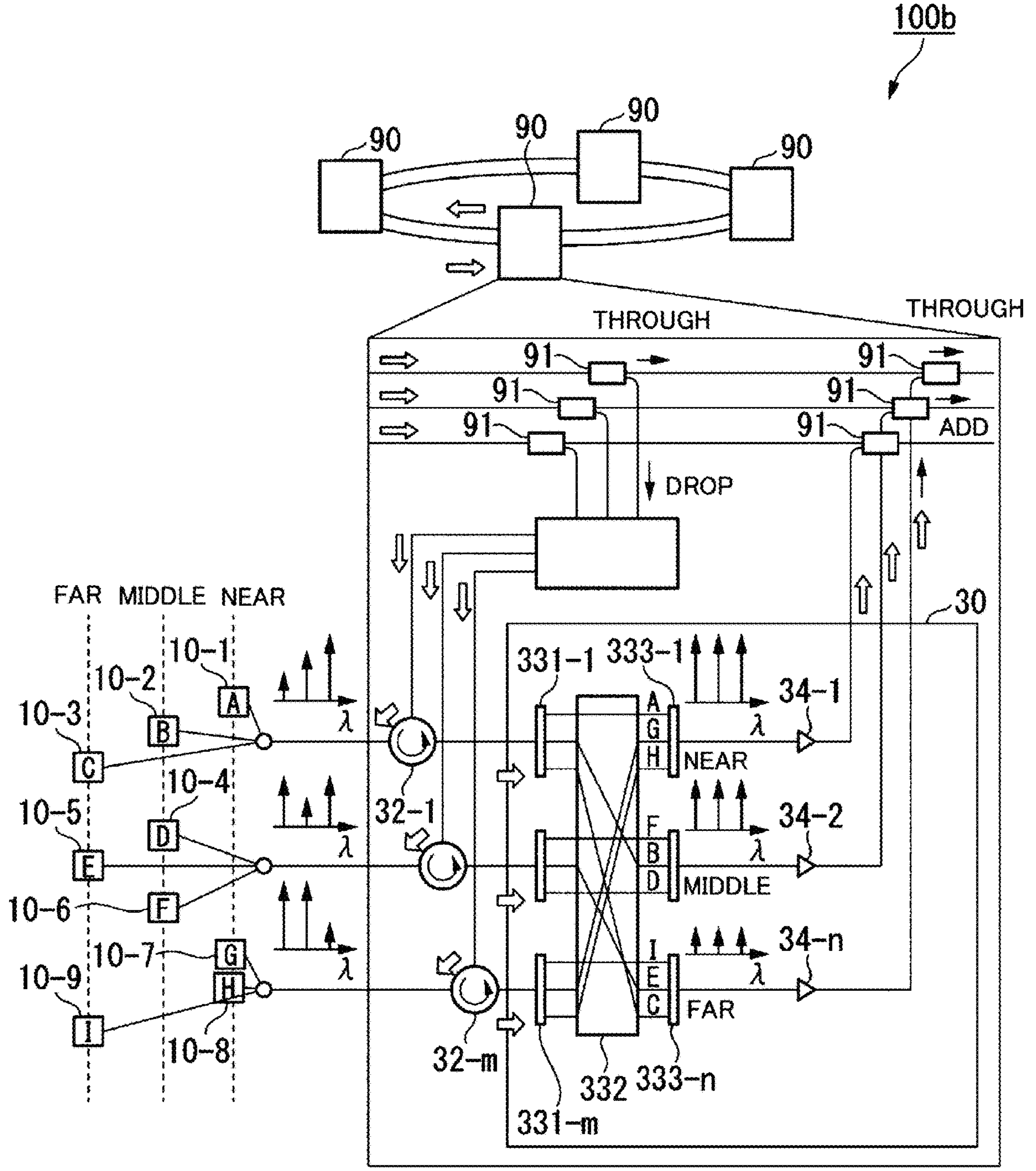
FIG. 8 is a diagram showing a configuration example of an optical communication system according to a third embodiment.

FIG. 8 is a diagram showing a configuration example of an optical communication system 100*b* according to the third embodiment. The basic system configuration of the third embodiment is the same as that of the first embodiment. A difference in the third embodiment is that the terminal relay node 30 or 50 is provided in a ROADM 90. FIG. 8 shows a case where the terminal relay node 30 is provided in the ROADM 90.

In FIG. 8, a clockwise path will be described as an example. An optical switch such as a WSS (Wavelength Selective Switch) 91 selects "through" or "drop" for each wavelength of the optical signal that has entered the ROADM 90. In the "through" path, the signal is transmitted to the next ROADM 90 as it is. In the "drop" path, the signal is transmitted to the user device 10 under the control of the ROADM 90. On the other hand, an optical signal transmitted from the user device 10 is input to the terminal relay node 30 and subjected to the same processing as in the first embodiment.

The optical communication system 100*b* configured as described above can be applied to a topology such as a ring configured with ROADMs.

Fourth Embodiment

For the sake of simplicity, in the first embodiment, a configuration in which two terminal relay nodes are connected in a one-to-one relationship is assumed. In the fourth embodiment, the configuration of 1:n connection will be described. In this case, each wavelength constituting the multiplexed signal after flattening by the method of the first embodiment is not necessarily a signal that should be output to the same path. Therefore, in the fourth embodiment, an optical switch is further added at the post-stage of the optical amplifier, and the optical signals having the same path are output to the same optical transmission line.

Figure 9:
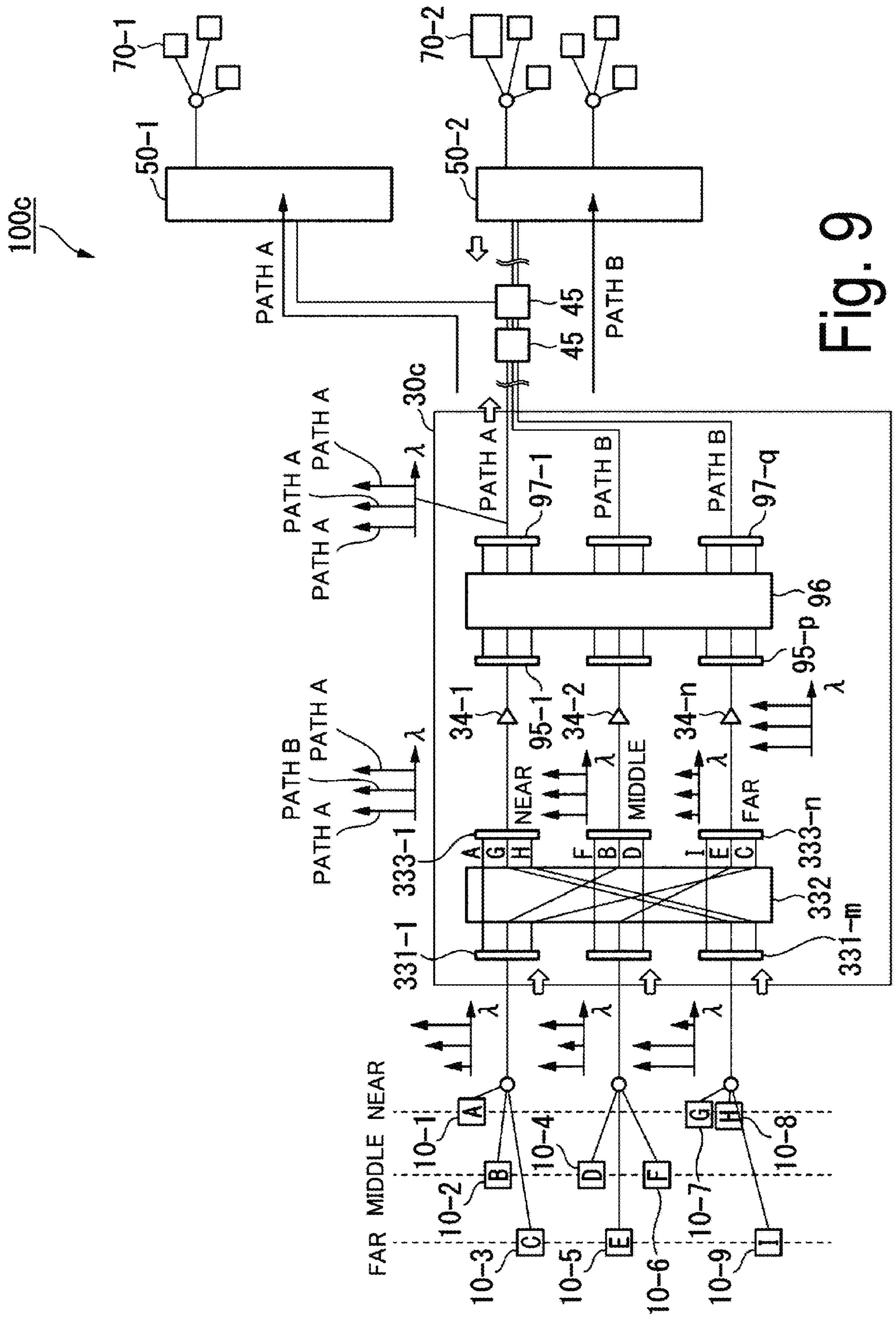
FIG. 9 is a diagram showing a configuration example of an optical communication system in a fourth embodiment.
Figure 10:
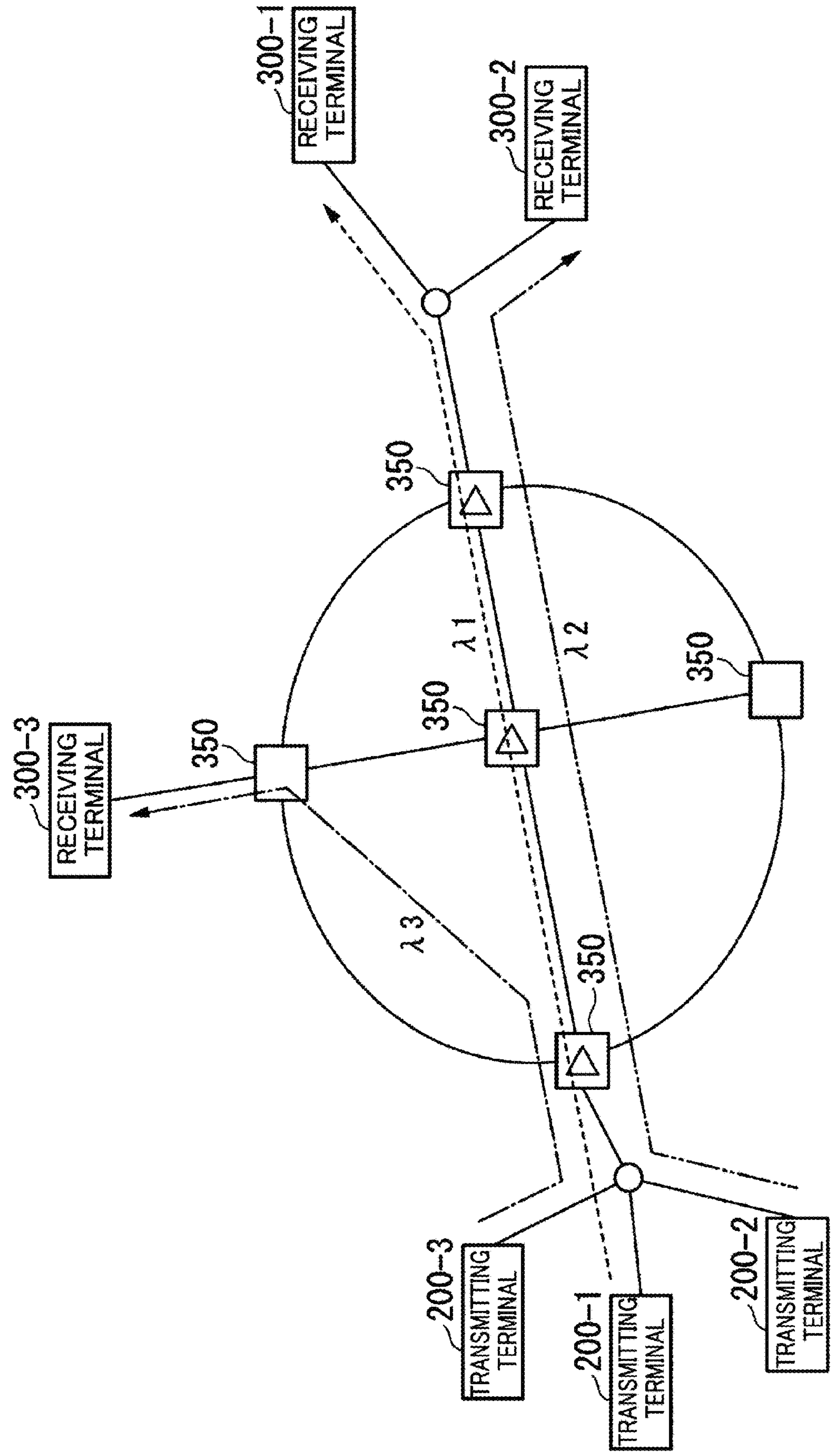
FIG. 10 is a diagram showing the configuration of an optical communication system that forms an all-optical network utilizing the WDM system.
Figure 11:
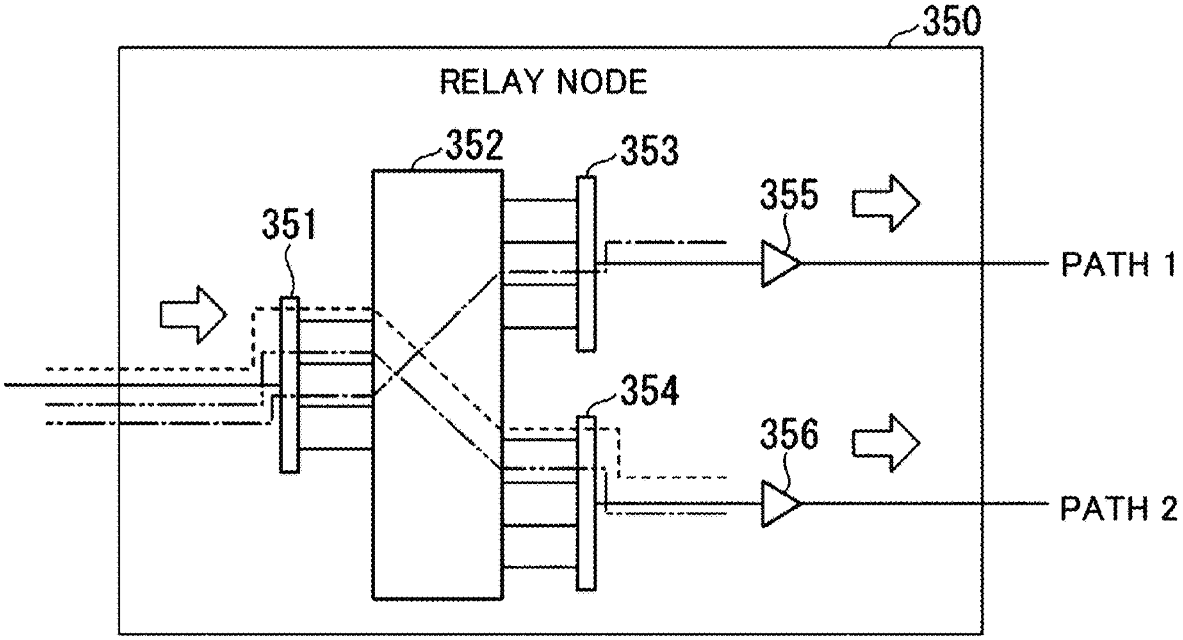
FIG. 11 is a diagram showing a configuration example of a conventional relay node.
Figure 12:
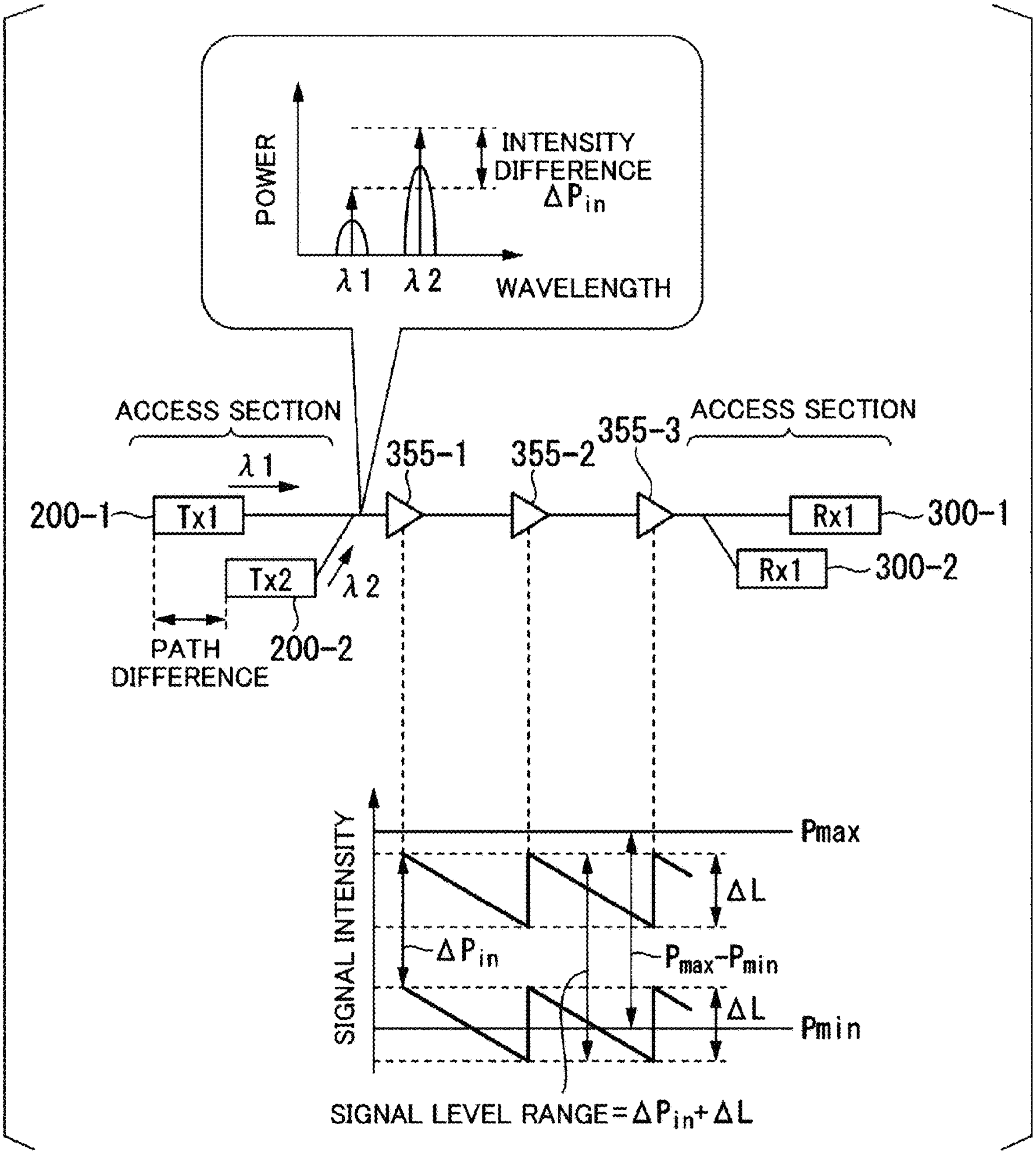
FIG. 12 is a diagram for explaining the problem of wavelength variation in an optical communication system that constitutes an all-optical network.
Figure 13:
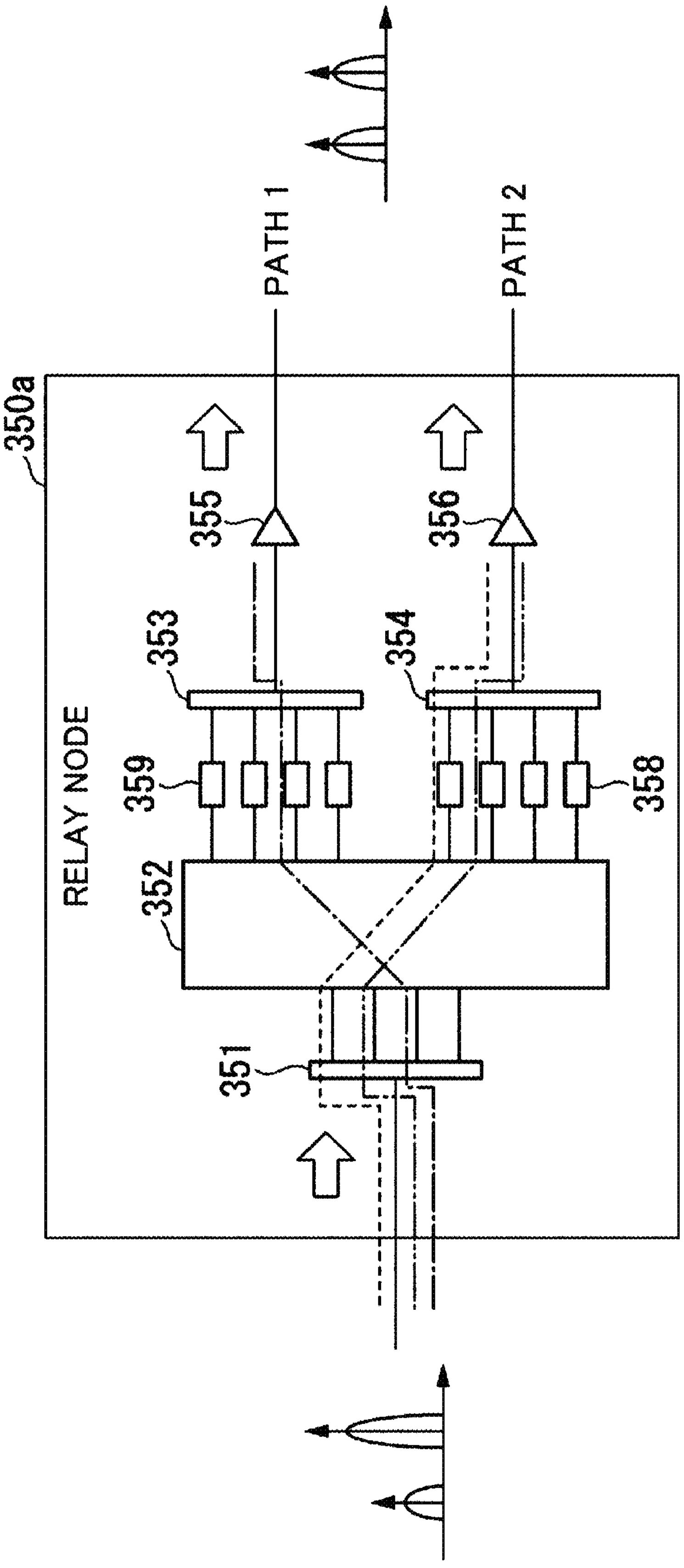
FIG. 13 is a diagram showing a configuration example of a relay node using a variable optical attenuator.
Figure 14:
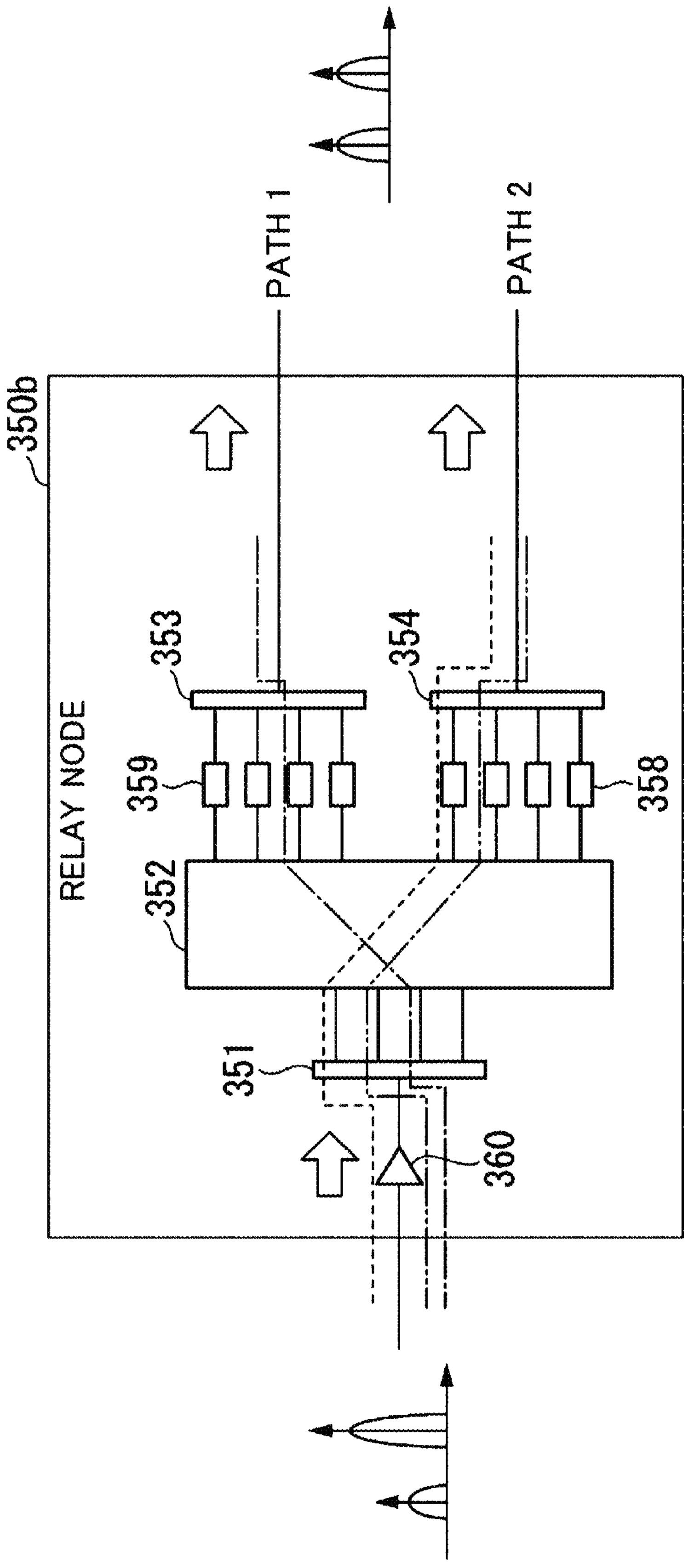
FIG. 14 is a diagram showing another configuration example of a relay node using variable optical attenuators.
Figure 15:
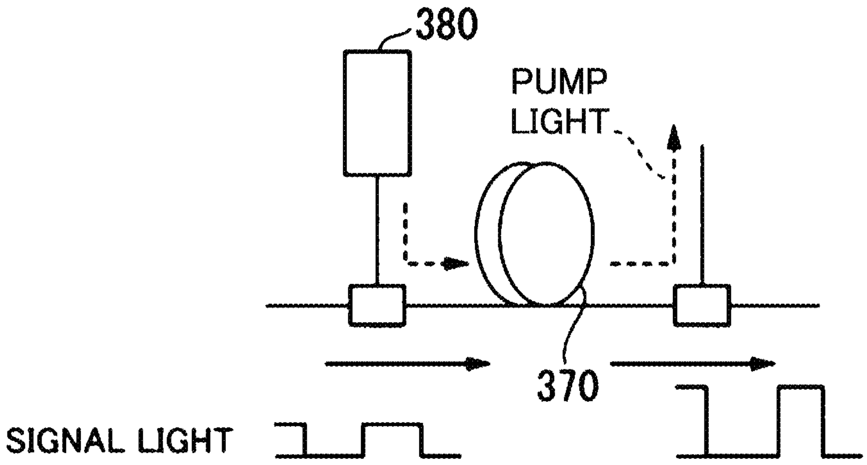
FIG. 15 is a diagram showing a configuration example of a fiber optical amplifier.

FIG. 9 is a diagram showing a configuration example of an optical communication system 100*c* according to the fourth embodiment. The basic system configuration of the fourth embodiment is the same as that of the first embodiment. The difference in the fourth embodiment lies in a plurality of terminal relay nodes 50 being provided and the configuration of the terminal relay node 30*c*.

Although FIG. 9 shows a case where there is one terminal relay node 30*c* and there is a plurality of terminal relay nodes 50, it may be reversed. In the following description, the configuration that is different from the first embodiment will be described.

The terminal relay nodes 50-1 and 50-2 are provided at different locations. For example, the terminal relay node 50-1 is provided at the location of path A of the terminal relay node 30*c*, and the terminal relay node 50-2 is provided at the location of path B of the terminal relay node 30*c*.

The terminal relay node 30*c* in the fourth embodiment additionally includes, at the post-stage of each optical amplifier 34, a plurality of wavelength multiplexers/demultiplexers 95-1 to 95-*p*, an optical SW 96, and a plurality of wavelength multiplexers/demultiplexers 97-1 to 97-*q* (q is an integer of 2 or more). The wavelength multiplexers/demultiplexers 95-1 to 95-*p* multiplex or demultiplex the input optical signals for each wavelength. The optical SW 96 is an optical switch having a plurality of first ports and a plurality of second ports. An optical signal input to one port of the optical SW 96 is output from another port. For example, an optical signal input to the first port of the optical SW 96 is output from the second port. The connection relationship between the first port and the second port of the optical SW 96 is set by the control of the optical switch control unit 38. The wavelength multiplexers/demultiplexers 97-1 to 97-*q* multiplex or demultiplex the input optical signals for each wavelength.

The optical switch control unit 38 performs the same processing as in the first embodiment. Furthermore, the optical switch control unit 38 controls connection between ports of the optical SW 96. For example, the optical switch control unit 38 controls connection between ports of the optical SW 96 so that optical signals to be transmitted to the same path are input to the same wavelength multiplexer/demultiplexer 97.

For example, the optical switch control unit 38 controls the connection between the ports of the optical SW 96 so that the optical signal to be transmitted to the path A is input to the wavelength multiplexer/demultiplexer 97-1, and controls the connection between the ports of the optical SW 96 so that the optical signal to be transmitted to the path B is input to the wavelength multiplexer/demultiplexer 97-*q*.

The optical communication system 100*c* configured as described above can be applied to a English Translation of configuration in which terminal relay nodes are connected in a one-to-n relationship.

Modifications common to the first to fourth embodiments will be described.

The management device 80 may be integrated with the terminal relay nodes 30, 30*a*, 30*b*, 30*c* and 50.

Some functional units of the terminal relay nodes 30, 30*a*, 30*b*, 30*c*, and 50 and the management device 80 in the above-described embodiments may be realized by a computer. In such a case, the program for realizing this function may be recorded on a computer-readable recording medium, and the program recorded on the recording medium may be read and executed by the computer system. Note that the "computer system" mentioned herein includes an OS (Operating System) and hardware such as peripheral devices.

In addition, the "computer-readable recording medium" refers to a portable medium such as a flexible disk, a magneto-optical disk, a ROM (Read Only Memory), or a CD-ROM or a storage device such as a hard disk that is built into the computer system. In addition, the "computer-readable recording medium" may also include a recording medium that dynamically retains a program for a short period of time, for example, a communication line used to transmit the program via a network (e.g. Internet) or other communication lines (e.g. telephone line) and a recording medium that retains the program for a certain period of time, for example, a server or a volatile memory installed within the computer system that serves as a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiment of the present invention has been described in detail with reference to the drawings, a specific configuration is not limited to this embodiment, and design within the scope of the gist of the present invention, and the like are included.

INDUSTRIAL APPLICABILITY

The present invention can be applied to optical communication systems using optical SWs.

REFERENCE SIGNS LIST

10, 10-1 to 10-9, 70 User device
20, 20-1 to 20-3, 60 Optical splitter
30, 50 Terminal relay node
31, 31-1 to 31-*m* Optical splitter
32, 32-1 to 32-*m*, 35, 35-1 to 35-*n* Circulator
33, 36 Path switching unit
34, 34-1 to 34-*n*, 38 Optical switch control unit
39 Optical amplifier control unit
40, 40-1 to 40-*m* Optical amplifier
42-1 to 42-*p* VOA
45 Relay node
80 Management device
81 Transmitting/receiving unit
82 Storage unit
83 Wavelength/path allocation unit
84 Light intensity adjustment information calculation unit
90 ROADM
91 WSS
37 User management terminal
41-1 to 41-*p*, 43-1 to 43-*p*, 95-1 to 95-*p*, 97-1 to 97-*q*, 331, 331-1 to 331-*m*, 333, 333-1 to 333-*n*, 361, 361-1 to 361-*n*, 363, 363-1 to 363-*m* Wavelength multiplexer/demultiplexer
96, 332, 362 Optical SW

The invention claimed is:

1. A signal intensity flattening method comprising:
classifying a plurality of user devices accommodated in the same relay node so that user devices with similar optical signal intensities are in the same class; and
setting a signal transmission path for converging optical signals transmitted from user devices of the same class in the same optical transmission line, and adjusting the signal intensities of the optical signals converged in the same optical transmission line collectively without separating them for each wavelength.

2. The signal intensity flattening method according to claim 1, wherein
the closeness of the optical signal intensities between user devices is determined according to a distance between each user device and the relay node, and the user devices are classified so that the user devices having similar optical signal intensities are in the same class.

3. The signal intensity flattening method according to claim 1, wherein
different wavelengths are allocated to user devices belonging to the same class.

4. The signal intensity flattening method according to claim 1, wherein
after adjusting the signal intensities of the optical signals converged in the same optical transmission line collectively for each class without separating them for each wavelength, the signal intensities of the optical signals are adjusted for each wavelength, and the optical signals of each wavelength, whose signal intensities are adjusted, are converged in the same optical transmission line.

5. The signal intensity flattening method according to claim 1, wherein
the optical signals whose signal intensities have been adjusted are transmitted to a path to which a destination relay node is connected.

6. A relay node comprising:
an allocator configured to classify a plurality of user devices accommodated therein so that user devices with similar optical signal intensities are in the same class, and sets a signal transmission path for converging optical signals transmitted from user devices of the same class in the same optical transmission line; and
an adjuster configured to adjust the signal intensities of the optical signals converged in the same optical transmission line by the allocator collectively without separating them for each wavelength.

7. A signal intensity flattening method comprising:
classifying a plurality of user devices accommodated in the same relay node into a minimum number of classes so that user devices with similar optical signal intensities are in the same class and a gain of a weak signal does not decrease due to gain saturation; and
setting a signal transmission path for converging optical signals transmitted from user devices of the same class in the same optical transmission line, and converging optical signals transmitted from user devices of the same class in the same optical transmission line.

8. A relay node comprising:
an allocator configured to classify a plurality of user devices accommodated in the same relay node into a minimum number of classes so that user devices with similar optical signal intensities are in the same class and a gain of a weak signal does not decrease due to gain saturation, sets a signal transmission path for converging optical signals transmitted from user devices of the same class in the same optical transmission line, and converges optical signals transmitted from user devices of the same class in the same optical transmission line.

* * * * *